(12) United States Patent
Cha et al.

(10) Patent No.: US 9,847,554 B2
(45) Date of Patent: *Dec. 19, 2017

(54) ORGANIC ELECTROLYTIC SOLUTION AND LITHIUM BATTERY COMPRISING ORGANIC ELECTROLYTE SOLUTION

(71) Applicant: Samsung SDI Co., Ltd., Yongin-si, Gyeonggi-do (KR)

(72) Inventors: Siyoung Cha, Yongin-si (KR); Myungheui Woo, Yongin-si (KR); Minju Lee, Yongin-si (KR); Woocheol Shin, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,054

(22) Filed: Mar. 11, 2016

(65) Prior Publication Data

US 2016/0268636 A1    Sep. 15, 2016

(30) Foreign Application Priority Data

Mar. 12, 2015 (KR) ........................ 10-2015-0034488

(51) Int. Cl.
*H01M 10/0568* (2010.01)
*H01M 10/0567* (2010.01)
*H01M 10/052* (2010.01)

(52) U.S. Cl.
CPC ..... *H01M 10/0567* (2013.01); *H01M 10/052* (2013.01); *H01M 10/0568* (2013.01); *H01M 2300/004* (2013.01); *Y02T 10/7011* (2013.01)

(58) Field of Classification Search
CPC ........... H01M 10/052; H01M 10/0567; H01M 10/0568; H01M 10/0569
See application file for complete search history.

(56) References Cited

U.S. PATENT DOCUMENTS

| | | | |
|---|---|---|---|
| 3,689,438 | A | 9/1972 | Bourat et al. |
| 9,263,766 | B2 * | 2/2016 | Makhmut .............. H01M 4/587 |
| 2009/0197167 | A1 | 8/2009 | Okschimke |
| 2010/0248041 | A1 | 9/2010 | Kikuchi et al. |
| 2011/0183218 | A1 | 7/2011 | Odani et al. |
| 2012/0220785 | A1 | 8/2012 | Bouteiller |
| 2012/0258357 | A1 | 10/2012 | Kim |
| 2012/0288769 | A1 | 11/2012 | Kono et al. |
| 2013/0177818 | A1 * | 7/2013 | Han ..................... H01M 10/052 429/303 |
| 2014/0272604 | A1 | 9/2014 | Lim et al. |
| 2015/0010811 | A1 | 1/2015 | Egorov et al. |
| 2015/0086861 | A1 | 3/2015 | Makhmut et al. |
| 2016/0211550 | A1 * | 7/2016 | Cha ................... H01M 10/0567 |

FOREIGN PATENT DOCUMENTS

KR    10-2014-0104383 A    8/2014
KR    10-2015-0033445 A    4/2015

OTHER PUBLICATIONS

Compound Summary for CID 248367, *PubChem/Open Chemistry Database*, NIH, U.S. National Library of Medicine, National Center for Biotechnology Information, Created Mar. 26, 20015, Modified Apr. 25, 2015, 11 pages.

Goethals et al., "The Disultone of 2.2-Dihydroxymethyl-1.3-Propane Disulphonic Acid," *Bull. Soc. Chim. Belg.*, 70, 1961, p. 218-220.

* cited by examiner

*Primary Examiner* — Anca Eoff
(74) *Attorney, Agent, or Firm* — Knobbe Martens Olson & Bear LLP

(57) ABSTRACT

Provided is an organic electrolyte solution including a disultone-based compound represented by Formula 1; a first lithium salt that is at least one selected from lithium bis (fluorosulfonyl) imide ($Li(FSO_2)_2N$) and lithium difluorophosphate ($LiPO_2F_2$); a second lithium salt; and an organic solvent:

Formula 1 wherein, in Formula 1, $A_1$, $A_2$, $A_3$, and $A_4$ are each independently a C1 to C5 alkylene group unsubstituted or substituted with a substituent; a carbonyl group; or a sulfinyl group, n1 to n4 are each independently 1 to 3, and when the number of $A_1$, $A_2$, $A_3$, and $A_4$ are each independently two or greater, the plurality of $A_1$, $A_2$, $A_3$, and $A_4$ are identical to or different from each other.

21 Claims, 4 Drawing Sheets

ORGANIC ELECTROLYTIC SOLUTION AND LITHIUM BATTERY COMPRISING ORGANIC ELECTROLYTE SOLUTION

CROSS-REFERENCE TO RELATED APPLICATION

Any and all applications for which a foreign or domestic priority claim is identified in the Application Data Sheet as filed with the present application are hereby incorporated by reference under 37 CFR 1.57. This application claims the benefit of Korean Patent Application No. 10-2015-0034488, filed on Mar. 12, 2015, in the Korean Intellectual Property Office, the disclosure of which is incorporated herein in its entirety by reference.

BACKGROUND

Field

This disclosure relates to an organic electrolyte solution and a lithium battery including the organic electrolyte solution.

Description of the Related Technology

Lithium batteries are typically used as power sources for portable electronic devices such as video camera, cell phones, and laptop computers. Rechargeable lithium secondary batteries have an energy density per unit weight that is about 3 times higher than that of conventional lead acid and may be rapidly charged.

Lithium batteries operate at a high driving voltage, and thus an aqueous-based electrolyte solution that is highly reactive with lithium may not be used in the lithium batteries. In general, lithium batteries use an organic electrolyte solution. The organic electrolyte solution is prepared by dissolving a lithium salt in an organic solvent. An organic solvent is stable at a high voltage, and a preferable organic solvent has a high ion conductivity, a high permittivity, and a low viscosity.

When a lithium battery includes an organic electrolyte solution including a lithium salt, lifespan characteristics and high-temperature stability of the lithium battery may deteriorate due to a side reaction between an anode/cathode and an electrolyte solution.

Therefore, an organic electrolyte solution providing a lithium battery having improved lifespan characteristics and high-temperature stability is needed.

SUMMARY

Some embodiments include a novel organic electrolyte solution for a lithium battery.

Some embodiments include a lithium battery including the organic electrolyte solution.

Additional aspects will be set forth in part in the description which follows and, in part, will be apparent from the description, or may be learned by practice of the presented embodiments.

In some embodiments, an organic electrolyte solution includes a disultone-based compound represented by Formula 1; a first lithium salt that is atleast one selected from lithium bis(fluorosulfonyl) imide ($Li(FSO_2)_2N$) and lithium difluorophosphate ($LiPO_2F_2$); a second lithium salt; and an organic electrolyte solution including an organic solvent:

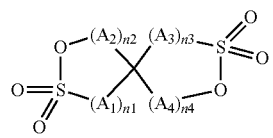

Formula 1

In Formula 1,
$A_1$, $A_2$, $A_3$, and $A_4$ are each independently selected from a C1-C5 alkylene group unsubstituted or substituted with a substituent; a carbonyl group; or a sulfinyl group,
wherein n1 to n4 are each independently an integer selected from 1 to 3, and
when the number of $A_1$, $A_2$, $A_3$, and $A_4$ are each independently two or greater, the plurality of $A_1$, $A_2$, $A_3$, and $A_4$ are identical to or different from each other.

In some embodiments, a lithium battery includes a cathode; an anode; and the organic electrolyte solution described above.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
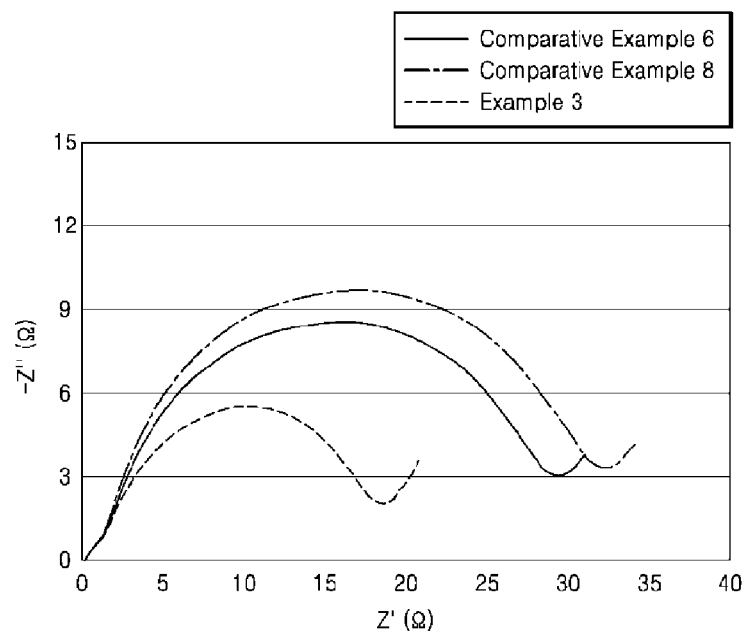
FIG. 1 shows a Nyquist plot of impedance measurement results after preserving lithium batteries prepared according to Example 3 and Comparative Examples 6 and 8 at a low temperature.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, according to exemplary embodiments, an organic electrolyte solution for a lithium battery and a lithium battery including the organic electrolyte solution will be described in detail.

In some embodiments an organic electrolyte solution includes a disultone-based compound represented by Formula 1; a first lithium salt that is atleast one selected from lithium bis(fluorosulfonyl) imide ($Li(FSO_2)_2N$) and lithium difluorophosphate ($LiPO_2F_2$); a second lithium salt; and an organic solvent.

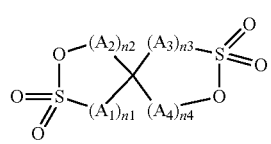

Formula 1

In some embodiments, in Formula 1, $A_1$, $A_2$, $A_3$, and $A_4$ are each independently a C1-C5 alkylene group unsubstituted or substituted with a substituent; a carbonyl group; or a sulfinyl group, wherein n1 to n4 are each independently an integer selected from 1 to 3, and when the number of $A_1$, $A_2$, $A_3$, and $A_4$ are each independently two or greater, the plurality of $A_1$, $A_2$, $A_3$, and $A_4$ may be identical to or different from each other.

When the disultone-based compound and the imide-based or phosphate-based lithium salt are added to a lithium battery electrolyte solution, battery performances such as lifespan characteristics and the lithium battery stability at low-temperature, room-temperature, or high-temperature may be improved. The disultone-based compound may have a structure including two sultone rings that are linked via a spiro-linkage.

Without being bound by any particular theory, it is believed that the reasons why the lithium battery performance improves when the disultone-based compound and the imide-based or phosphate-based lithium salt are added are described further.

Generally, a lithium battery undergoes an irreversible reaction using an excessive amount of charge during charging/discharging of the battery. A passivation layer, such as a solid electrolyte interface (SEI) layer, is formed on a surface of an anode by the irreversible reaction. The SEI layer prevents decomposition of an electrolyte solution and serves as an ion tunnel during charging/discharging of the lithium battery. When the SEI layer has high stability and low resistance, lifespan of the lithium battery may be improved. Also, a protection layer is formed on a surface of a cathode through the irreversible reaction. The protection layer prevents decomposition of an electrolyte solution and serves as an ion tunnel during charging/discharging of the lithium battery. When the protection layer has high stability at a high temperature, lifespan of the lithium battery may be improved.

A sulfonate ester group included in the disultone-based compound may be reduced by itself by accepting electrons from a surface of the anode during a charging process, or may react with a previously reduced polar solvent molecule, thereby affecting characteristics of an SEI layer formed on the surface of the anode. For example, the disultone-based compound including the sulfonate ester group may more likely accept electrons from the anode, compared to polar solvent. Therefore, the disultone-based compound is reduced at a voltage lower than a polar solvent before the polar solvent is reduced. Hence, by including the sulfonate ester group, the disultone-based compound may be more easily reduced and/or decomposed to radicals and/or ions during a charging process. Thus, the radicals and/or ions may bind with lithium ions to form an appropriate SEI layer on the anode thereby preventing an additional decomposition of the solvent. For example, the disultone-based compound may form a covalent bond with various functional groups existing on the surface of the carbonaceous anode or a carbon-based anode itself, or may be adsorbed onto a surface of the anode, thereby forming a modified SEI layer with improved stability. The modified SEI layer formed by such binding and/or adsorption may be more durable even after charging and discharging for a long time, compared to an SEI layer formed from only an organic solvent and a lithium salt. The stable modified SEI layer may more effectively block co-intercalation of the organic solvent solvating lithium ions during intercalation of the lithium ions into the anode. Accordingly, the modified SEI layer may more effectively block direct contact between the organic solvent and the anode to further improve reversibility of intercalation and deintercalation of lithium ions, and consequently improve discharge capacity and lifetime characteristics of the battery.

Alternatively, due to the inclusion of the sulfonate ester group, the disultone-based compound may coordinate a surface of a cathode, thereby affecting characteristics of a protection layer formed on the surface of the cathode. For example, the sulfonate ester group may form a complex by being coordinated to the transition metal ions. This complex may form a modified protection layer with improved stability that is more durable even after charging and discharging for a long time compared to a protection layer formed only from the organic solvent. The stable modified protection layer may more effectively block co-intercalation of the organic solvent solvating lithium ions during intercalation of the lithium ions. Accordingly, the modified protection layer may more effectively block direct contact between the organic solvent and the cathode to further improve reversibility of intercalation and deintercalation of lithium ions, and consequently improve stability and lifetime characteristics of the battery Furthermore, since the disultone-based compound has a plurality of rings that are linked in a spiro form, a molecular weight of the disultone-based compound may be relatively higher than corresponding monocyclic disultone-based compound, and thus the disultone-based compound may have improved thermal stability. Moreover, an internal resistance of the lithium battery including the disultone-based compound may decrease.

Accordingly, the disultone-based compound may form the SEI layer on the surface of the anode, and may form the protection layer on the surface of the cathode, and hence the high-temperature stability of the lithium battery may improve thereby demonstrating improved thermal stability.

In addition, the imide-based or phosphate-based lithium salt may be coordinated to the thermal decomposition product of the second lithium salt or an anion dissociated from the second lithium salt existing in the organic electrolyte solution, thereby stabilizing the thermal decomposition product and/or the anion. When the thermal decomposition product of the second lithium salt or the anion dissociated from the second lithium salt are stabilized, a side reaction between the thermal decomposition product or the anion and the organic electrolyte solution may be suppressed. Thus, lifespan characteristics and high-temperature stability of the lithium battery may be improved. Also, when the imide-based or phosphate-based lithium salt suppresses the side reaction of the organic electrolyte solution, the SEI layer and/or protection layer may have a low resistance. Therefore, an internal resistance of the lithium battery may decrease.

Accordingly, the organic electrolyte solution including the disultone-based compound and the imide based and/or phosphate-based lithium salt may provide stability and improved charging/discharging characteristics to the lithium battery at a temperature in a wide range, for example, from about −30° C. to about 85° C.

In some embodiments, the organic electrolyte solution, includes an amount of the disultone-based compound represented by Formula 1 in a range of about 0.01 wt % to about 10 wt % based on the total weight of the organic electrolyte solution, but embodiments are not limited thereto. In some embodiments, an amount of the disultone-based compound represented by Formula 1 may be in a range of about 0.1 wt % to about 10 wt % based on the total weight of the organic electrolyte solution. In some embodiments, an amount of the disultone-based compound represented by Formula 1 may be in a range of about 0.1 wt % to about 7 wt % based on the total weight of the organic electrolyte solution. In some embodiments, an amount of the disultone-based compound represented by Formula 1 may be in a range of about 0.1 wt % to about 5 wt % based on the total weight of the organic electrolyte solution. In some embodiments, an amount of the disultone-based compound represented by Formula 1 may be in a range of about 0.2 wt % to about 5 wt % based on the total weight of the organic electrolyte solution. In some embodiments, an amount of the disultone-based compound represented by Formula 1 may be in a range of about 0.5 wt % to about 5 wt % based on the total weight of the organic electrolyte solution. In some embodiments, an amount of the disultone-based compound represented by Formula 1 may be in a range of about 0.5 wt % to about 3 wt % based on the total weight of the organic electrolyte solution. When the amount of the disultone-based compound represented by Formula 1 is within these ranges above, the lithium battery may have further improved characteristics.

In some embodiments the organic electrolyte solution, includes an amount of the first lithium salt in a range of about 0.01 wt % to about 5 wt % based on the total weight of the organic electrolyte solution. In some embodiments, an amount of the first lithium salt in the organic electrolyte solution may be in a range of about 0.1 wt % to about 4 wt % based on the total weight of the organic electrolyte solution. In some embodiments, an amount of the first lithium salt in the organic electrolyte solution may be in a range of about 0.1 wt % to about 3.5 wt % based on the total weight of the organic electrolyte solution. In some embodiments, an amount of the first lithium salt in the organic electrolyte solution may be in a range of about 0.1 wt % to about 3 wt % based on the total weight of the organic electrolyte solution. In some embodiments, an amount of the first lithium salt in the organic electrolyte solution may be in a range of about 0.2 wt % to about 3 wt % based on the total weight of the organic electrolyte solution. In some embodiments, an amount of the first lithium salt in the organic electrolyte solution may be in a range of about 0.3 wt % to about 3 wt % based on the total weight of the organic electrolyte solution. In some embodiments, an amount of the first lithium salt in the organic electrolyte solution may be in a range of about 0.3 wt % to about 2 wt % based on the total weight of the organic electrolyte solution. When the amount of the first lithium salt 1 is within these ranges above, the lithium battery may have further improved characteristics.

In some embodiments, the organic electrolyte solution may further include a non-polar unsaturated group-containing cyclic carbonate compound. The non-polar unsaturated group-containing cyclic carbonate compound may contain a non-polar unsaturated group such as vinyl group, a substituted vinyl group, or a combination thereof.

In some embodiments, the non-polar unsaturated group-containing cyclic carbonate compound may be atleast one selected from the group consisting of vinylene carbonate (VC); vinylene carbonate substituted with atleast one substituent selected from a halogen, a cyano group (CN), and a nitro group ($NO_2$); vinyl ethylene carbonate (VEC); and vinyl ethylene carbonate substituted with atleast one substituent selected from a halogen, a cyano group (CN), and a nitro group ($NO_2$). In some embodiments, only one type of the non-polar unsaturated group-containing cyclic carbonate compound may be used. In some embodiments, atleast two types of the non-polar unsaturated group-containing cyclic carbonate compound may be used at the same time.

In some embodiments, the non-polar unsaturated group-containing cyclic carbonate compound may be vinylene carbonate (VC), vinyl ethylene carbonate (VEC), or a combination thereof. Particularly, in the vinylene carbonate (VC), carbons having a $sp_2$ hybrid orbital constitute a pentagonal structure. Accordingly, the vinylene carbonate (VC) may have a high reactivity inclined to have a stable structure due to an unstable structure on account of high ring strain. Therefore, the vinylene carbonate (VC) may be easily reduced and/or decomposed by the ring-opening reaction during initial charging and thus may contribute in the formation of a stable SEI layer.

In some embodiments, the organic electrolyte solution, includes an amount of the non-polar unsaturated group-containing cyclic carbonate compound in a range of about 0.01 wt % to about 5 wt % based on the total weight of the organic electrolyte solution. In some embodiments, the organic electrolyte solution, includes an amount of the non-polar unsaturated group-containing cyclic carbonate compound in a range of about 0.1 wt % to about 4 wt % based on the total weight of the organic electrolyte solution. In some embodiments, the organic electrolyte solution, includes an amount of the non-polar unsaturated group-containing cyclic carbonate compound in a range of about 0.1 wt % to about 3.5 wt % based on the total weight of the organic electrolyte solution. In some embodiments, the organic electrolyte solution, includes an amount of the non-polar unsaturated group-containing cyclic carbonate compound in a range of about 0.1 wt % to about 3 wt % based on the total weight of the organic electrolyte solution. In some embodiments, the organic electrolyte solution, includes an amount of the non-polar unsaturated group-containing cyclic carbonate compound in a range of about 0.2 wt % to about 3 wt % based on the total weight of the organic electrolyte solution. In some embodiments, the organic electrolyte solution, includes an amount of the non-polar unsaturated group-containing cyclic carbonate compound in a range of about 0.3 wt % to about 3 wt % based on the total weight of the organic electrolyte solution. In some embodiments, the organic electrolyte solution, includes an amount of the non-polar unsaturated group-containing cyclic carbonate compound in a range of about 0.3 wt % to about 2 wt % based on the total weight of the organic electrolyte solution. When the amount of the non-polar unsaturated group-containing cyclic carbonate compound in the organic electrolyte solution is within these ranges above, the lithium battery may have further improved characteristics.

In some embodiments, the organic electrolyte solution, includes a second lithium salt selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are each independently an integer of 1 to 20), LiCl, LiI, or a mixture thereof, but embodiments are not limited thereto, and any lithium salt availed in the art may be used.

In some embodiments, the organic electrolyte solution, includes a concentration of the second lithium salt in a range of about 0.01 M to about 2.0 M. In some embodiments, the organic electrolyte solution includes a concentration of the second lithium salt in a range of about 0.05 M to about 2.0 M. In some embodiments, the organic electrolyte solution includes a concentration of the second lithium salt may be in a range of about 0.1 M to about 2.0 M. In some embodiments, the organic electrolyte solution includes a concentration of the second lithium salt may be in a range of about 0.5 M to about 2.0 M. The concentration of the second lithium salt is not limited to the above described embodiments, but a suitable concentration of the second lithium salt for the organic electrolyte solution may be used. When the concentration of the second lithium salt is within these ranges above, the lithium battery may have further improved characteristics.

In some embodiments, wherein the disultone-based compound is represented by Formula 1, atleast one of $A_1$, $A_2$, $A_3$, and $A_4$ is an unsubstituted C1 to C5 alkylene group or a substituted C1 to C5 alkylene group, and a substituent group of the substituted C1 to C5 alkylene group may be a C1 to C5 alkylene group unsubstituted or substituted with halogen; a C1 to C5 aryl group unsubstituted or substituted with halogen; a C2 to C10 heteroaryl group unsubstituted or substituted with halogen; a C2 to C5 alkenyl group unsubstituted or substituted with halogen; a C2 to C5 alkynyl group unsubstituted or substituted with halogen; or a polar functional group including a hetero atom.

In some embodiments, the substituent group of the substituted C2 to C5 alkenyl group in the disultone-based compound represented by Formula 1 may be selected from a halogen, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrolyl group, and a pyridinyl group, but embodiments are not limited thereto, and any substituent group suitable as a substituent group of an alkenyl group availed in the art may be used.

In some embodiments, the substituent group of the substituted C1 to C5 alkyl group in the disultone-based compound represented by Formula 1 may be selected from a polar functional group including a heteroatom, and the heteroatom of the polar functional group may be at least one selected from the group consisting of oxygen, nitrogen, phosphorus, sulfur, silicon, and boron.

In some embodiments, the polar functional group including the heteroatom may include atleast one selected from the group consisting of —F, —Cl, —Br, —I, —C(=O)OR$^{16}$, —OR$^{16}$, —OC(=O)OR$^{16}$, —R$^{15}$OC(=O)OR$^{16}$, —C(=O)R$^{16}$, —R$^{15}$C(=O)R$^{16}$, —OC(=O)R$^{16}$, —R$^{15}$OC(=O)R$^{16}$, —C(=O)—O—C(=O)R$^{16}$, —R$^{15}$C(=O)—O—C(=O)R$^{16}$, —SR$^{16}$, —R$^{15}$SR$^{16}$, —SSR$^{16}$, —R$^{15}$SSR$^{16}$, —S(=O)R$^{16}$, —R$^{15}$S(=O)R$^{16}$, —R$^{15}$C(=S)R$^{16}$, —R$^{15}$SO$_3$R$^{16}$, —SO$_3$R$^{16}$, —NNC(=S)R$^{16}$, —R$^{15}$NNC(=S)R$^{16}$, —R$^{15}$N=C=S, —NCO, —R$^{15}$—NCO, —NO$_2$, —R$^{15}$NO$_2$, —R$^{15}$SO$_2$R$^{16}$, —SO$_2$R$^{16}$,

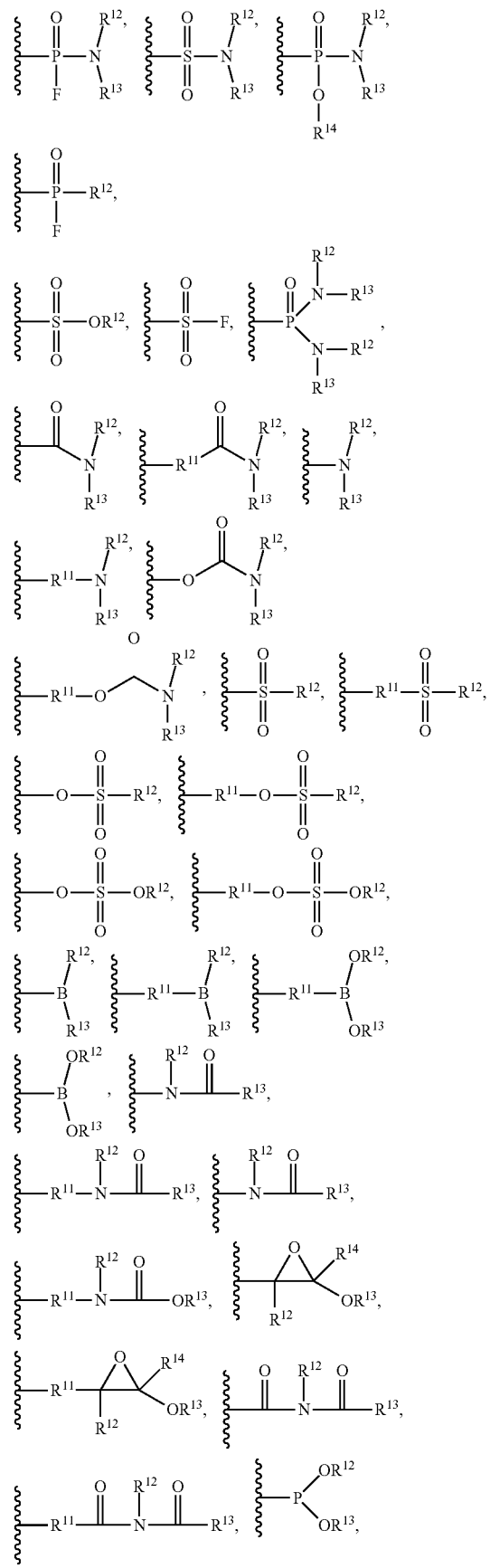

-continued

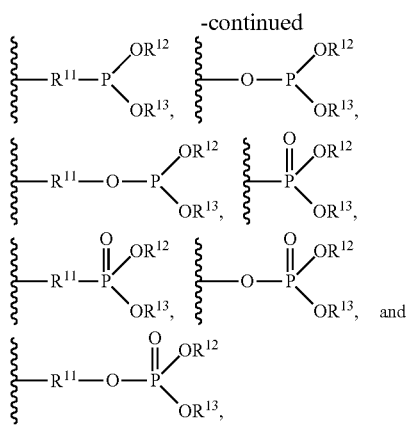

In some embodiments, $R^{11}$ and $R^{15}$ are each independently a C1-C10 alkylene group unsubstituted or substituted with halogen; a C2 to C10 alkenylene group unsubstituted or substituted with halogen; a C2 to C10 alkynylene group unsubstituted or substituted with halogen; a C3 to C10 cycloalkylene group unsubstituted or substituted with halogen; a C5 to C10 arylene group unsubstituted or substituted with halogen; a C2 to C10 heteroarylene group unsubstituted or substituted with halogen; a C6 to C15 alkylarylene group unsubstituted or substituted with halogen; or a C6 to C15 aralkylene group unsubstituted or substituted with halogen, and $R^{12}$, $R^{13}$, $R^{14}$, and $R^{16}$ are each independently a hydrogen atom; a halogen atom; a C1 to C10 alkyl group unsubstituted or substituted with halogen; a C2 to C10 alkenyl group unsubstituted or substituted with halogen; a C2 to C5 alkynyl group unsubstituted or substituted with halogen; a C3 to C10 cycloalkyl group unsubstituted or substituted with halogen; a C5 to C10 aryl group unsubstituted or substituted with halogen; a C2 to C10 heteroaryl group unsubstituted or substituted with halogen; a C6 to C15 alkylaryl group unsubstituted or substituted with halogen; a C6 to C15 trialkylsilyl group unsubstituted or substituted with halogen; or a C6 to C15 aralkyl group unsubstituted or substituted with halogen.

In some embodiments, the halogen substituted to the alkyl group, alkenyl group, alkynyl group, cycloalkyl group, aryl group, heteroaryl group, alkylaryl group, trialkylsilyl group, or aralkyl group included in the polar functional group including a heteroatom may be a fluorine atom.

In some embodiments, the disultone-based compound may be represented by one of Formulae 2 and 3:

Formula 2

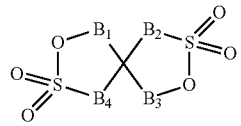

Formula 3

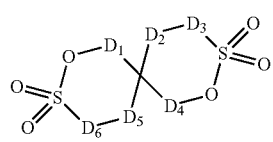

In some embodiments, in Formulae 2 and 3, $B_1$, $B_2$, $B_3$, $B_4$, $D_1$, $D_2$, $D_3$, $D_4$, $D_5$, and $D_6$ each may be independently selected from a —C($E_1$)($E_2$)- group; a carbonyl group (—C(=O)—); or a sulfinyl group (—S(=O)—), and $E_1$ and $E_2$ may be each independently selected from a hydrogen atom; a halogen atom; a C1 to C10 alkyl group unsubstituted or substituted with halogen; a C2 to C10 alkenyl group unsubstituted or substituted with halogen; a C2 to C10 alkynyl group unsubstituted or substituted with halogen; a C3 to C10 cycloalkenyl group unsubstituted or substituted with halogen; a C3 to C10 heterocyclic group; a C5 to C10 aryl group unsubstituted or substituted with halogen; or a C2 to C10 heteroaryl group unsubstituted or substituted with halogen.

In some embodiments, $E_1$ and $E_2$ each may be independently selected from a hydrogen atom; a halogen atom; a C1 to C10 alkyl group unsubstituted or substituted with halogen; a C5 to C10 aryl group unsubstituted or substituted with halogen; or a C2 to C10 heteroaryl group unsubstituted or substituted with halogen.

In some embodiments, $E_1$ and $E_2$ each may be independently selected from a hydrogen atom, a fluorine atom, a chlorine atom, a bromine atom, an iodine atom, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrolyl group, or a pyridinyl group.

In some embodiments, $E_1$ and $E_2$ each may be independently selected from a hydrogen atom, a fluorine atom, a methyl group, an ethyl group, a trifluoromethyl group, a pentafluoroethyl group, or a phenyl group.

In some embodiments, the disultone-based compound may be represented by one of Formulae 4 and 5:

Formula 4

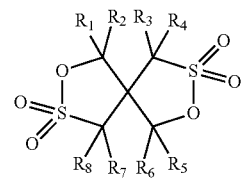

Formula 5

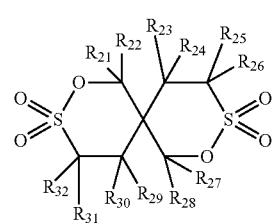

In some embodiments, in Formulae 4 and 5, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ each may be independently selected from a hydrogen atom; a halogen atom; a C1 to C10 alkyl group unsubstituted or substituted with halogen; a C5 to C10 aryl group unsubstituted or substituted with halogen; or a C2 to C10 heteroaryl group unsubstituted or substituted with halogen.

In some embodiments, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ each may be independently selected from a hydrogen atom, a fluorine atom, a chlorine atom, a bromine atom, an iodine atom, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrole group, or a pyridine group.

In some embodiments, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ are each independently selected from a hydrogen atom, a fluorine atom, a methyl group, an ethyl group, a propyl group, a trifluoromethyl group, a pentafluoroethyl group, or a phenyl group.

In some embodiments, the disultone-based compound may be represented by one of Formulae 6 to 17:

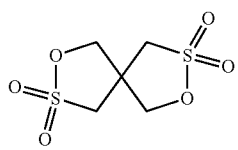

Formula 6

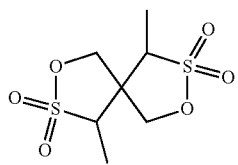

Formula 7

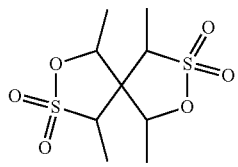

Formula 8

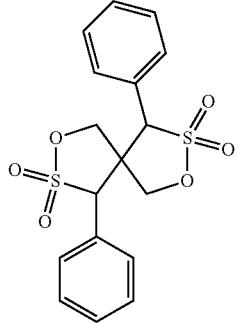

Formula 9

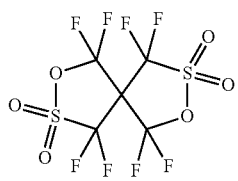

Formula 10

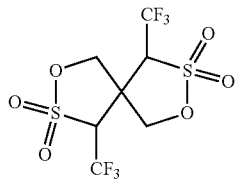

Formula 11

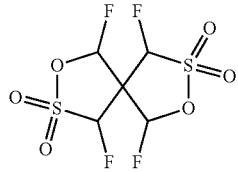

Formula 12

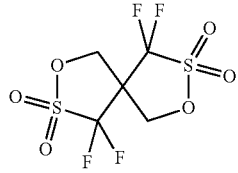

Formula 13

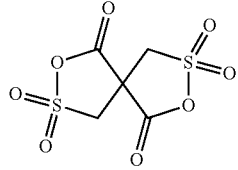

Formula 14

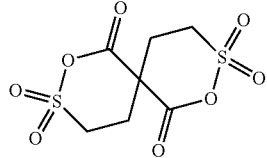

Formula 15

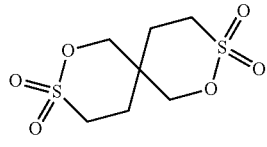

Formula 16

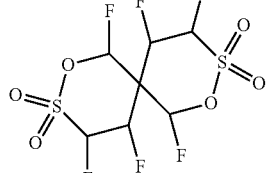

Formula 17

The organic solvent included in the organic electrolyte solution may be a solvent that is a low-melting point solvent. The low-melting point solvent denotes a solvent that has a melting point of 200° C. or lower at a temperature of 25° C. and a pressure of 1 atm.

In some embodiments, the organic solvent may include at least one selected from the group consisting of dialkylcarbonate, cyclic carbonate, linear or cyclic ester, linear or cyclic amide, aliphatic nitrile, linear or cyclic ether, and a derivative thereof.

In some embodiments, the organic solvent may include atleast one selected from the group consisting of dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), fluoroethylene carbonate (FEC), butylenes carbonate, ethyl propionate, ethyl butyrate, acetonitrile, succinonitrile (SN), dimethylsulfoxide, dimethylformamide, dimethylacetamide, gamma-valerolactone, gamma-butyrolactone, and tetrahydrofuran, but embodiments are not limited thereto, and any low-melting point solvent available in the art may be used.

The organic electrolyte solution may be in a liquid state or a gel state. The organic electrolyte solution may be prepared by adding the disultone-based compound of Formula 1, the first lithium salt, the second lithium salt to the organic solvent.

As used herein, a and b in the term "Ca to Cb" denote the number of carbons in the corresponding functional group. For example, the functional group may include carbon atoms in the integers selected from a to b. For example, the term "C1 to C4 alkyl group" denotes an alkyl group having 1 to 4 carbons, wherein a is 1 and b is 4, wherein examples of the alkyl group may include $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

Naming of a particular radical may include a mono-radical or a di-radical depending on the context. For example, when a substituent needs two binding sites for binding with the rest of the molecule, the sub stituent may be recognized as a di-radical. For example, a substituent such as an alkyl group that needs two binding sites may be a di-radical, such as —$CH_2$—, —$CH_2CH_2$—, or —$CH_2CH(CH_3)CH_2$.

As used herein, the term "alkyl group" denotes a branched or unbranched aliphatic hydrocarbon group. In some embodiments, the alkyl group may be substituted or unsubstituted. The alkyl group may include a methyl group, an ethyl group, a propyl group, an isopropyl group, a butyl group, an isobutyl group, a tert-butyl group, a pentyl group, a hexyl group, but embodiments are not limited thereto, and each of which may be optionally substituted or unsubstituted. In some embodiments, the alkyl group may have 1 to 5 carbon atoms. For example, the C1-C5 alkyl group may be a methyl group, an ethyl group, a propyl group, an isopropyl group, a butyl group, an iso-butyl group, a sec-butyl group, a pentyl group, a 3-pentyl group, or a hexyl group, but embodiments are not limited thereto.

As used herein, the term "cycloalkyl group" denotes a carbocycle or a ring system that is completely saturated. Examples of the cycloalkyl group may be a cyclopropyl group, a cyclobutyl group, a cyclopentyl group, and a cyclohexyl group.

As used herein, the term "alkenyl group" refers to a hydrocarbon group including 2 to 10 carbon atoms with at least one carbon-carbon double bond. Non-limiting examples of the alkenyl group are an ethenyl group, a 1-propenyl group, a 2-propenyl group, a 2-methyl-1-propenyl group, a 1-butenyl group, and a 2-butenyl group. For example, these alkenyl groups may be substituted or unsubstituted. For example, an alkenyl group may have 2 to 10 carbon atoms.

As used herein, the term "alkynyl group" refers to a hydrocarbon group including 2 to 10 carbon atoms with at least one carbon-carbon triple bond. Non-limiting examples of the alkynyl group are an ethynyl group, a 1-propynyl group, a 1-butynyl group, and a 2-butynyl group. For examples, these alkynyl groups may be substituted or not. For example, an alkynyl group may have 2 to 10 carbon atoms.

As used herein, the term "aromatic" refers to a ring or ring system with a conjugated π electron system, and may refer to a carbocyclic aromatic group (for example, a phenyl group and a heterocyclic aromatic group (for example, a pyridine group). For example, an aromatic ring system as a whole may include a single ring or a fused polycyclic ring (i.e., a ring that shares adjacent atom pairs).

As used herein, the terms "aryl group" refers to an aromatic ring or ring system (i.e., a ring fused from at least two rings, which shares two or more adjacent carbon atoms) of at least two ring including only carbon atoms in its backbone. When the aryl group is a ring system, each ring in the ring system may be aromatic. Non-limiting examples of the aryl group are a phenyl group, a biphenyl group, a naphthyl group, a phenanthrenyl group, and a naphthalenyl group. These aryl groups may be substituted or not.

As used herein, the term "heteroaryl group" refers to an aromatic ring system with one or plural fused rings, in which at least one member of a ring is a heteroatom, i.e., not carbon. In the fused ring system, at least one heteroatom may be in one ring. For example, the heteroatom may be oxygen, sulfur, or nitrogen, but is not limited thereto. Non-limiting examples of the heteroaryl group are a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group.

As used herein, the terms "aralkyl group" or "alkylaryl group" refers to an aryl group linked to a substituent via an alkyl group, like a C6-C15 aralkyl group. Non-limiting examples of the aralkyl group or alkylaryl group are a benzyl group, a 2-phenylethyl group, a 3-phenylpropyl group, and a naphthylalkyl group. For example, the alkylene group may be a lower alkyl group (i.e., a C1-C5 alkyl group).

As used herein, the terms "cycloalkenyl group" refers to a non-aromatic carbocyclic ring or ring system with at least one double bond. For example, the cycloalkenyl group may be a cyclopropenyl group, a cyclopentenyl group, and a cyclohexenyl group.

As used herein, the terms "heterocyclic group" refers to a non-aromatic ring or ring system including at least one heteroatom in its cyclic backbone.

As used herein, the term "halogen" refers to a stable atom belonging to Group 17 of the periodic tables of elements, for example, fluorine, chlorine, bromine, or iodine. For example, the halogen atom may be fluorine and/or chlorine.

As used herein, a substituent may be derived by substitution of at least one hydrogen atom in an unsubstituted mother group with another atom or a functional group. Unless stated otherwise, a substituted functional group refers to a functional group substituted with at least one substituent selected from a C1-C10 alkyl group, a C2-C10 alkenyl group, a C3-C10 cycloalkyl group, a C3-C10 cycloalkenyl group, a C1-C10 alkyl group, and a C5-C10 aryl group. When a functional group is "optionally" substituted, it means that the functional group may be substituted with such a substituent as listed above.

According to another embodiment, a lithium battery includes a cathode, an anode, and any of the organic electrolytic solutions according to the above-described embodiments. The lithium battery may be any type of a lithium battery, for example, a lithium primary battery, or a lithium secondary battery such as a lithium ion battery, a lithium ion polymer battery, or a lithium sulfur battery.

For example, the anode of the lithium battery may include graphite. The lithium battery may have a high voltage of about 4.35V or greater.

For example, the lithium battery may be manufactured using a method described below.

Preparation of a cathode is described as follows:

For example, a cathode active material, a conducting agent, a binder, and a solvent are mixed to prepare a cathode active material composition. The cathode active material composition may be directly coated on a metallic current collector to prepare a cathode plate. Alternatively, the cathode active material composition may be cast on a separate support to form a cathode active material film, which may then be separated from the support and laminated on a metallic current collector to prepare a cathode plate. The cathode is not limited to the examples described above, and may be one of a variety of types.

The cathode active material may be any one available in the art, for example, may be a lithium-containing metal oxide. For example, the cathode active material may be at least one composite oxide of lithium and a metal selected from cobalt, manganese, nickel, and a combination thereof. For example, the cathode active material may be a compound represented by one of the following formulae: $Li_aA_{1-b}B^1{}_bD^1{}_2$ (where $0.90 \leq a \leq 1.8$, and $0 \leq b \leq 0.5$); $Li_aE_{1-b}B^1{}_bO_{2-c}D^1{}_c$ (where $0.90 \leq a \leq 1.8$, $0 \leq b \leq 0.5$, $0 \leq c \leq 0.05$); $LiE_{2-b}B^1{}_bO_{4-c}D^1{}_c$ (where $0 \leq b \leq 0.5$, $0 \leq c \leq 0.05$); $Li_aNi_{1-b-c}Co_bB^1{}_cD^1{}_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Co_bB^1{}_cO_{2-\alpha}F^1{}_\alpha$ (where $0.90 \leq a \leq 1.8$, $0 \leq b \leq 0.5$, $0 \leq c \leq 0.05$, $0 < \alpha < 2$); $Li_aNi_{1-b-c}Co_bB^1{}_cO_{2-\alpha}F^1{}_2$ (where $0.90 \leq a \leq 1.8$, $0 \leq b \leq 0.5$, $0 \leq c \leq 0.05$, $0 < \alpha < 2$); $Li_aNi_{1-b-c}Mn_bB^1{}_cD^1{}_\alpha$ (where $0.90 \leq a \leq 1.8$, $0 \leq b \leq 0.5$, $0 \leq c \leq 0.05$, $0 < \alpha < 2$); $Li_aNi_{1-b-c}Mn_bB^1{}_cO_{2-\alpha}F^1{}_\alpha$ (where $0.90 \leq a \leq 1.8$, $0 \leq b \leq 0.5$, $0 \leq c \leq 0.05$, $0 < \alpha < 2$); $Li_aNi_{1-b-c}Mn_bB^1{}_cO_{2-\alpha}F^1{}_2$ (where $0.90 \leq a \leq 1.8$, $0 \leq b \leq 0.5$, $0 \leq c \leq 0.05$, $0 < \alpha < 2$); $Li_aN_{i_b}E_cG_dO_2$ (where $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A may be selected from the group consisting of nickel (Ni), cobalt (Co), manganese (Mn), and combinations thereof; $B^1$ may be selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ may be selected from the group consisting of oxygen (O), fluorine (F), sulfur (S), phosphorus (P), and combinations thereof; E may be selected from the group consisting of cobalt (Co), manganese (Mn), and combinations thereof; $F^1$ may be selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q may be selected from the group consisting of titanium (Ti), molybdenum (Mo), manganese (Mn), and combinations thereof; $I^1$ may be selected from the group consisting of chromium (Cr), vanadium (V), iron (Fe), scandium (Sc), yttrium (Y), and combinations thereof; and J may be selected from the group consisting of vanadium (V), chromium (Cr), manganese (Mn), cobalt (Co), nickel (Ni), copper (Cu), and combinations thereof.

In some embodiments, the cathode active material may be $LiCoO_2$, $LiMn_xO_{2x}$ (x=1, 2), $LiNi_{1-x}Mn_xO_{2x}$ ($0 < x < 1$), $LiNi_{1-x-y}Co_xMn_yO_2$ ($0 \leq x \leq 0.5$ and $0 \leq y \leq 0.5$), or $LiFePO_4$.

The compounds listed above as cathode active materials may have a coating layer on surfaces thereof. Alternatively, a mixture of a compound without a coating layer and a compound having a coating layer may be used. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or the like. The coating methods may be well understood by one of ordinary skill in the art, and thus a detailed description thereof will be omitted.

The conducting agent may be carbon black or graphite particulates, but is not limited thereto. Any material availed as a conducting agent in the art may be used.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a binder in the art may be used.

Examples of the solvent are N-methyl-pyrrolidone, acetone, and water. Any material available as a solvent in the art may be used.

The amounts of the cathode active material, the conducting agent, the binder, and the solvent may be in ranges that are commonly used in lithium batteries. At least one of the conducting agent, the binder and the solvent may not be used according to the use and the structure of the lithium battery.

In addition to the preparation of the cathode, an anode is prepared as follows:

For example, an anode active material, a conducting agent, a binder, and a solvent are mixed to prepare an anode active material composition. The anode active material composition is directly coated on a metallic current collector and dried to prepare an anode plate. Alternatively, the anode active material composition may be cast on a separate support to form an anode active material film, which may then be separated from the support and laminated on a metallic current collector to prepare an anode plate.

The anode active material may be any anode active material for a lithium battery availed in the art. For example, the anode active material may include at least one selected from the group consisting of lithium metal, a metal that is alloyable with lithium, a transition metal oxide, a non-transition metal oxide, and a carbonaceous material.

Examples of the metal alloyable with lithium are Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Examples of the transition metal oxide are a lithium titanium oxide, a vanadium oxide, and a lithium vanadium oxide.

For example, the non-transition metal oxide may be $SnO_2$ or $SiO_x$ (0<x<2).

Examples of the carbonaceous material are crystalline carbon, amorphous carbon, and mixtures thereof. Examples of the crystalline carbon are graphite, such as natural graphite or artificial graphite are in amorphous, plate, flake, spherical, or fibrous form. Examples of the amorphous carbon are soft carbon (carbon sintered at low temperatures), hard carbon, meso-phase pitch carbides, and sintered cokes.

The conducting agent, the binder and the solvent used for the anode active material composition may be the same as those used for the cathode active material composition.

The amounts of the anode electrode active material, the conducting agent, the binder, and the solvent are those levels generally used in lithium batteries. At least one of the conducting agent, the binder and the solvent may not be used according to the use and the structure of the lithium battery.

Next, a separator to be deposed between the cathode and the anode may be prepared.

The separator for the lithium battery may be any separator that is commonly used in lithium batteries. The separator may have low resistance to migration of ions in an electrolyte and have an excellent electrolyte-retaining ability. Examples of the separator are glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate and a mixture thereof.

Next, an organic electrolytic solution as described in the previous embodiments may be prepared.

Figure 6:
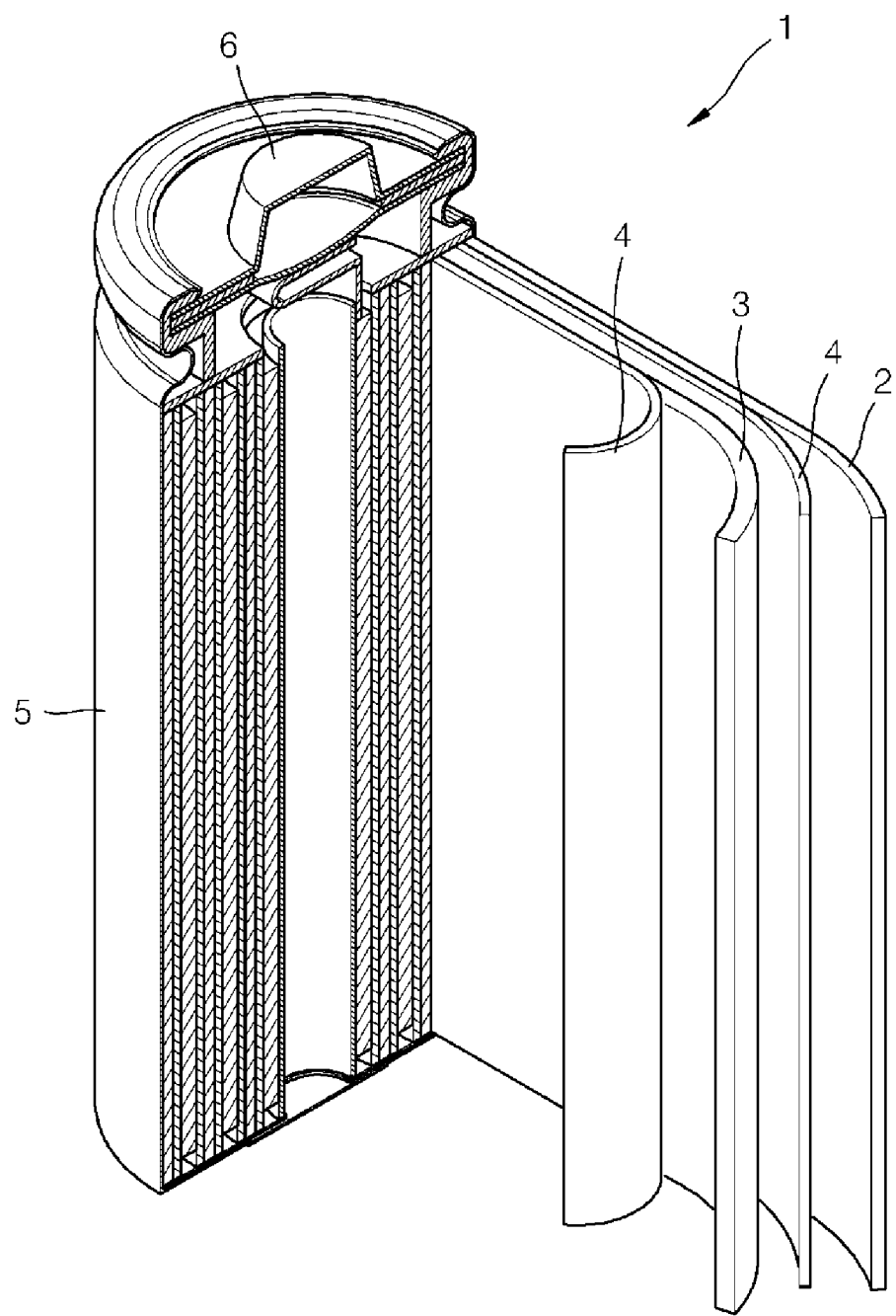
FIG. 6 is a schematic view of a lithium battery according to an exemplary embodiment.

As shown in FIG. 6, a lithium battery 1 includes a cathode 3, an anode 2, and a separator 4. The cathode 3, the anode 2, and the separator 4 are wound or folded, and then accommodated in a battery case 5. Then, the battery case 5 is filled with the organic electrolytic solution and sealed with a cap assembly 6, thereby completing the manufacture of the lithium battery 1. The battery case 5 may be a cylindrical type, a rectangular type, or a thin-film type. For example, the lithium battery 1 may be a thin-film type battery. The lithium battery may be a lithium ion battery.

The separator 4 may be interposed between the cathode 3 and the anode 2 to form a battery assembly. Alternatively, the battery assembly may be stacked in a bi-cell structure and impregnated with the electrolytic solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output, for example, in a laptop computer, a smart phone, and an electric vehicle.

The lithium battery may have improved lifetime characteristics and high rate characteristics, and thus may be applicable in an electric vehicle (EV), for example, in a hybrid vehicle such as plug-in hybrid electric vehicle (PHEV). The lithium battery may be applicable to the high-power storage field, for example, in an electric bicycle or a power tool.

Hereinafter, one or more embodiments of the present disclosure will be described in detail with reference to the following examples. However, these examples are not intended to limit the scope of the one or more embodiments of the present disclosure.

SYNTHESIS OF ADDITIVES

Preparation Example 1

Synthesis of Compound of Formula 6 Below

A compound represented by Formula 6 below was prepared according to Reaction Scheme 1 below.

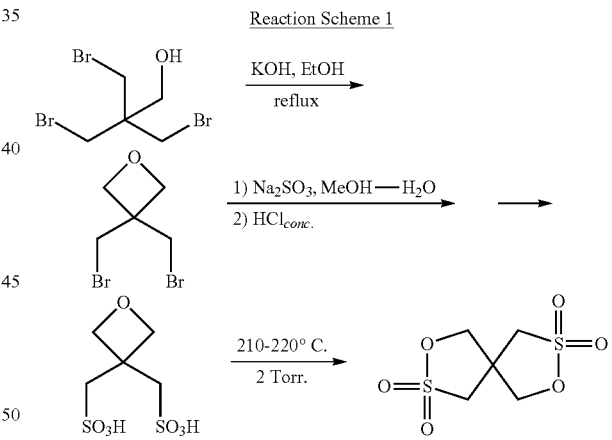

A solution of 10.34 g (0.156 mole) of potassium hydroxide dissolved in 200 ml of ethanol was dropwise added into a solution of 50 g (0.154 mole) of pentaerythritol tribromide dissolved in 200 ml of ethanol, and the resulting mixture was refluxed for about 30 minutes. The resulting reaction product was cooled down to room temperature, and then filtered to remove KBr, followed by evaporating ethanol. The residue was distilled in a vacuum to obtain 28 g (0.115 mole) of 3,3-bis(bromomethyl)oxacyclobutane (yield: 75%, b.p.: 72-78° C. @ 10 mmHg).

$^1$H NMR (400 MHz, CDCl3): δ 3.84 (s, 4H), 4.42 (s, 4H), 4.58 (s, 4H).

A solution of 28 g (0.115 mole) of bis(bromomethyl) oxacyclobutane dissolved in a mixed solvent of 94 mL of methanol and 28 mL of water was added dropwise into a solution of 44.8 g (0.358 mol) of Na$_2$SO$_3$ dissolved in 252 mL of water. The resulting mixture was refluxed for about 3.5 hours, and the solvent was removed in vacuum. The residue was treated with 200 ml of concentrated HCl (conc. HCl), and filtered to remove NaCl, thereby obtaining a sulfonic acid solution, which was then filtered under vacuum. The resulting residue oil was heated at about 2 mmHg at about 210-220° C. for about 2 hours to obtain black mass, which was then extracted with boiling dioxane and then filtered in a hot state. The filtrate was cooled down to crystallize.

Yield: 10 g (38%, m.p.: 244-246° C.). $^1$H NMR (400 MHz, DMSO-d6): δ 3.87 (s, 2H), 3.88 (s, 2H), 4.58 (s, 4H).

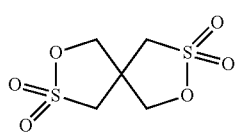

Formula 6

Preparation of Organic Electrolytic Solutions

Example 1

1.15 M LiPF$_6$ as a second lithium salt, 1.0 wt % of a disultone-based compound represented by Formula 6, 1.0 wt % of lithium difluorophosphate (LiPO$_2$F$_2$) represented by Formula 18 as a first lithium salt, and 0.5 wt % of vinylene carbonate (VC) represented by Formula 19 were added into a mixed solvent of ethylene carbonate (EC), ethyl methyl carbonate (EMC), and dimethyl carbonate (DMC) in a volume ratio of 2:4:4 to obtain an organic electrolytic solution.

Reaction Scheme 1

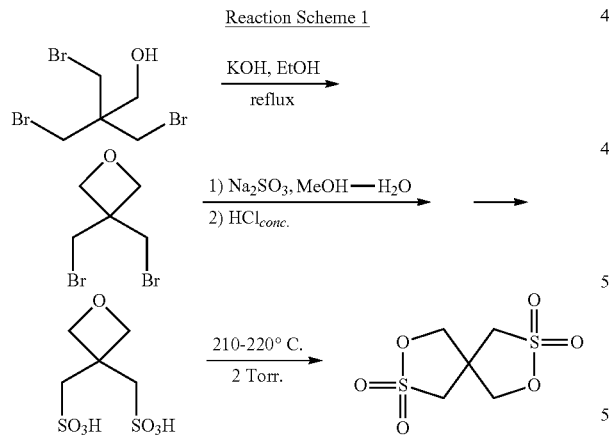

A solution of 10.34 g (0.156 mole) of potassium hydroxide dissolved in 200 ml of ethanol was dropwise added into a solution of 50 g (0.154 mole) of pentaerythritol tribromide dissolved in 200 ml of ethanol, and the resulting mixture was refluxed for about 30 minutes. The resulting reaction product was cooled down to room temperature, and then filtered to remove KBr, followed by evaporating ethanol. The residue was distilled in a vacuum to obtain 28 g (0.115 mole) of 3,3-bis(bromomethyl)oxacyclobutane (yield: 75%, b.p.: 72-78° C. @ 10 mmHg).

$^1$H NMR (400 MHz, CDCl3): δ 3.84 (s, 4H), 4.42 (s, 4H), 4.58 (s, 4H).

A solution of 28 g (0.115 mole) of bis(bromomethyl) oxacyclobutane dissolved in a mixed solvent of 94 mL of methanol and 28 mL of water was added dropwise into a solution of 44.8 g (0.358 mol) of Na$_2$SO$_3$ dissolved in 252 mL of water. The resulting mixture was refluxed for about 3.5 hours, and the solvent was removed under vacuum. The residue was treated with 200 ml of concentrated HCl (conc. HCl), and filtered to remove NaCl, thereby obtaining a sulfonic acid solution, which was then filtered under vacuum. The resulting residue oil was heated at about 2 mmHg at about 210-220° C. for about 2 hours to obtain black mass, which was then extracted with boiling dioxane and then filtered in hot state. The filtrate was cooled down to crystallize.

Yield: 10 g (38%, m.p.: 244-246° C.). $^1$H NMR (400 MHz, DMSO-d6): δ 3.87 (s, 2H), 3.88 (s, 2H), 4.58 (s, 4H).

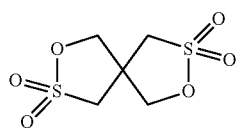

Formula 6

Preparation of Organic Electrolytic Solutions

Example 1

1.15 M LiPF$_6$ as a second lithium salt, 1.0 wt % of a disultone-based compound represented by Formula 6, 1.0 wt % of lithium difluorophosphate (LiPO$_2$F$_2$) represented by Formula 18 as a first lithium salt, and 0.5 wt % of vinylene carbonate (VC) represented by Formula 19 were added into a mixed solvent of ethylene carbonate (EC), ethyl methyl carbonate (EMC), and dimethyl carbonate (DMC) in a volume ratio of 2:4:4 to obtain an organic electrolytic solution.

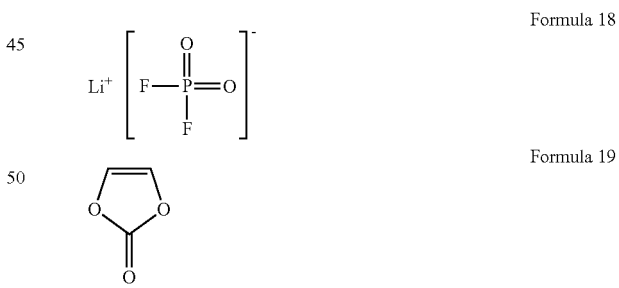

Formula 18

Formula 19

Example 2

1.15 M LiPF$_6$ as a second lithium salt, 1.0 wt % of a disultone-based compound represented by Formula 6, 1.0 wt % of lithium bis(fluorosulfonyl)imide (Li(FSO$_2$)$_2$N) represented by Formula 20 as a first lithium salt, and 0.5 wt % of vinylene carbonate (VC) represented by Formula 19 were added into a mixed solvent of ethylene carbonate (EC), ethyl methyl carbonate (EMC), and dimethyl carbonate (DMC) in a volume ratio of 2:4:4 to obtain an organic electrolytic solution.

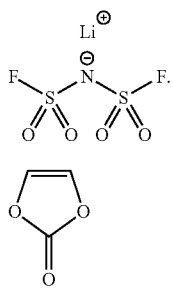

Formula 20

Formula 19

Comparative Example 1

$LiPO_2F_2$+VC

An organic electrolyte solution was prepared according to the same manner as in Example 1, except that the disultone-based compound of Formula 6 was not added.

Comparative Example 2

$Li(FSO_2)_2N$+VC

An organic electrolyte solution was prepared according to the same manner as in Example 2, except that the disultone-based compound of Formula 6 was not added.

Comparative Example 3

$LiPO_2F_2$ Only

An organic electrolyte solution was prepared according to the same manner as in Example 1, except that the disultone-based compound of Formula 6 and vinylene carbonate of Formula 19 were not added.

Comparative Example 4

$Li(FSO_2)_2N$ Only

An organic electrolyte solution was prepared according to the same manner as in Example 2, except that the disultone-based compound of Formula 6 and vinylene carbonate of Formula 19 were not added.

Comparative Example 5

1.15 M $LiPF_6$ as a lithium salt was added into a mixed solvent of ethylene carbonate (EC), ethylmethylcarbonate (EMC), and dimethylcarbonate (DMC) at a volume ratio of 2:4:4 to prepare an organic electrolyte solution. That is, a disultone-based compound, a first lithium salt, and a vinylene carbonate were not added into the organic electrolyte solution.

Preparation of Lithium Battery

Example 3

Preparation of Cathode

About 93.0 wt % of $LiNi_{0.6}Co_{0.2}Mn_{0.2}O_2$ as a cathode active material, 4.0 wt % Denka black as a conducting agent, and 3.0 wt % of PVDF (SOLEF® 6020, available from Solvay, Bollate, Italy) as a binder were mixed with N-methyl-2-pyrolidone as a solvent and stirred for about 30 minutes using a mechanical stirrer to prepare a cathode active material composition. The cathode active material composition was coated on a 20 μm-thick aluminum (Al) current collector to a thickness of about 60 μm with a doctor blade. Then, the resultant was dried in a hot-air dryer at about 100° C. for about 0.5 hour, and then at about 120° C. in a vacuum for 4 hours, followed by roll-pressing to manufacture a cathode having the cathode active material layer on the current collector. The cathode active material layer thus prepared had a density of 3.15 g/cc and a loading level of 27.05 mg/cm².

Preparation of Anode

About 97 wt % of graphite particles (MC20, availed from Mitsubishi Chemicals, Tokyo, Japan) as an anode active material, 1.5 wt % BM408 (availed from Daicel, Osaka, Japan) as a conducting agent, and 1.5 wt % of BM400-B (availed from Zeon, Tokyo, Japan) as a binder were mixed with N-methyl-2-pyrolidone as a solvent and stirred for about 60 minutes using a mechanical stirrer to prepare an anode active material composition. The anode active material composition was coated on a 10 μm-thick copper (Cu) current collector to a thickness of about 60 μm with a doctor blade. Then, the resultant was dried in a hot-air dryer at about 100° C. for about 0.5 hour, and then at about 120° C. in a vacuum for 4 hours, followed by roll-pressing to manufacture an anode having the anode active material layer on the current collector. The anode active material layer thus prepared had a density of 1.55 g/cc and a loading level of 14.36 mg/cm².

Manufacture of Lithium Battery

The cathode, the anode, a 18 μm-thick polyethylene separator with a ceramic coating, and the organic electrolytic solution of Example 1 above were used to manufactured a lithium battery.

Example 4

A lithium battery was prepared according to the same manner as in Example 3, except that the organic electrolyte solution prepared according to Example 2 was used instead of the organic electrolyte solution prepared according to Example 1.

Comparative Examples 6 to 10

Lithium batteries were prepared according to the same manner as in Example 3, except that the organic electrolyte solutions prepared according to Comparative Examples 1 to 5 were respectively used instead of the organic electrolyte solution prepared according to Example 1.

Evaluation Example 1

Evaluation of Initial Capacity and Initial Direct Current Internal Resistance (DC-IR) (Bio-Logic VMP3, USA)

Initial discharge capacities of the lithium batteries prepared according to Examples 3 and 4 and Comparative Examples 6 to 10 at room temperature (25° C.) were measured and then direct current internal resistances (DC-IR) of the lithium batteries prepared according to Examples 3 and 4 and Comparative Examples 6 to 10 at room temperature (25° C.) were measured as follows.

In the 1$^{st}$ cycle, each of the batteries was charged with a current of 0.5 C until a voltage that is 50% of a state of charge (SOC), cut-off at a current of 0.02 C, and rested for 10 minutes, discharged with a constant current of 0.5 C for 30 seconds, rested for 30 seconds, charged with a constant current of 0.5 C for 30 seconds, and rested for 10 minutes, discharged with a constant current of 1.0 C for 30 seconds, rested for 30 seconds, charged with a constant current of 0.5 C for 1 minute, and rested for 10 minutes, discharged with a constant current of 2.0 C for 30 seconds, rested for 30 seconds, charged with a constant current of 0.5 C for 2 minutes, and rested for 10 minutes, and discharged with a constant current of 3.0 C for 30 seconds, rested for 30 seconds, charged with a constant current of 0.5 C for 3 minutes, and rested for 10 minutes.

An average voltage decrease value for 30 seconds per C-rate of each of the batteries means a direct-current internal resistance value, i.e., R=ΔV/ΔI.

The initial discharge capacities and direct current resistances thus measured are shown in Table 1.

TABLE 1

|  | Initial discharge capacity [mA] | Initial 30-second direct current resistance [mΩ] |
| --- | --- | --- |
| Example 3 | 217.910 | 333.214 |
| Example 4 | 218.040 | 328.742 |
| Comparative Example 6 | 216.653 | 340.013 |
| Comparative Example 7 | 217.910 | 343.547 |
| Comparative Example 8 | 218.450 | 338.207 |
| Comparative Example 9 | 217.826 | 325.062 |
| Comparative Example 10 | 218.880 | 337.076 |

As shown in Table 1, the lithium batteries of Examples 3 and 4 including the organic electrolyte solution described above had initial discharge capacities that were increased or similar to initial discharge capacities of the lithium batteries of Comparative Examples 6 to 10, which did not include the organic electrolyte solution described above. Also, direct current resistances of the lithium batteries of Examples 3 and 4 were decreased or similar to direct current resistances of the lithium batteries of Comparative Examples 6 to 10.

Evaluation Example 2

Evaluation of Low-temperature Impedance

The lithium batteries prepared according to Examples 3 and 4 and Comparative Examples 6 to 10 were charged with a constant current to a voltage that is 50% of SOC at the first cycle and cut-off at a current of 0.02 C, and impedances of the lithium batteries were measured by using a 2-probe method with an impedance analyzer (Material Mates 7260 impedance analyzer, Milano, Italy) at −30° C. In the impedance measurement, a range of frequency was about 0.1 Hz to about 10 MHz. A Nyquist plot illustrating some of the results of the impedance measurement is shown in FIG. 1.

As shown in FIG. 1, a resistance of the lithium battery of Example 3 was significantly reduced compared to resistances of the lithium batteries of Comparative Examples 6 and 8 after preserving the lithium batteries at a low temperature. Therefore, it may be known that an initial output of the lithium battery of Example 3 significantly increased at a low temperature.

Evaluation Example 3

Evaluation of Charging/Discharging Characteristics at Room Temperature (25° C.)

The lithium batteries prepared according to Examples 3 and 4 and Comparative Examples 6 to 10 were each charged at a constant current of 0.1 C rate at 25° C. until a voltage of 4.3 V (vs. Li), and then the charging was cut-off at a current of 0.05 C rate while maintaining a constant voltage mode at 4.3 V, followed by discharging with a constant current of 0.1 C rate until the voltage reached about 2.8 V (vs. Li) (formation process, 1$^{st}$ cycle).

Each of the lithium batteries through the 1$^{st}$ cycle of the formation process was charged at a constant current of 0.2 C rate at about 25° C. to a voltage of about 4.2 V (vs. Li), and then the charging was cut-off at a current of 0.05 C rate while maintaining a constant voltage mode at 4.3 V, followed by discharging with a constant current of 0.2 C rate until the voltage reached about 2.8 V (vs. Li) (formation process, 2$^{nd}$ cycle).

Each of the lithium battery underwent the 2$^{nd}$ cycle of the formation process was charged at a constant current of 0.5 C rate at about 25° C. to a voltage of about 4.3 V (vs. Li), and then the charging was cut-off at a current of 0.05 C rate while maintaining a constant voltage mode at 4.3 V, followed by discharging with a constant current of 1.0 C rate until the voltage reached about 2.8 V (vs. Li). The cycle of charging and discharging was repeated 200 times.

A rest time of about 10 minutes was allowed after each charge and discharge cycle.

Figure 2:
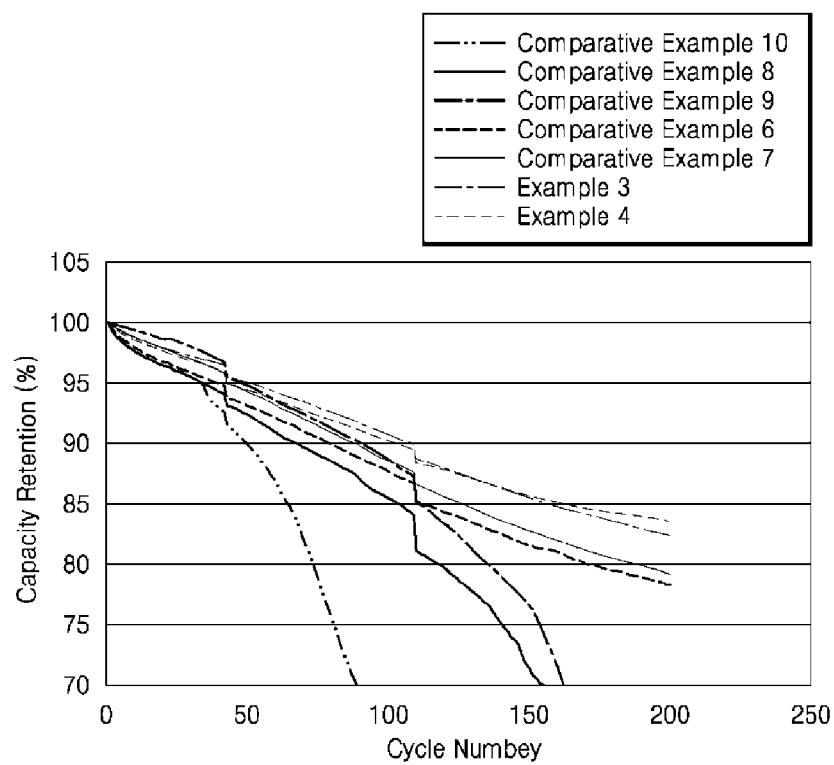
FIG. 2 is a graph illustrating lifespan characteristics of lithium batteries prepared according to Examples 3 and 4 and Comparative Examples 6 to 10 at room temperature.

Some of the charge-discharge test results are shown in Table 2 and FIG. 2. A capacity retention rate at 200$^{th}$ cycle may be defined using Equation 1 below.

Capacity retention rate=[Discharge capacity at 200$^{th}$ cycle/Discharge capacity at 1$^{st}$ cycle]×100    Equation 1

TABLE 2

|  | Capacity retention rate at 200$^{th}$ cycle [%] |
| --- | --- |
| Example 3 | 82.4 |
| Example 4 | 83.6 |
| Comparative Example 6 | 78.3 |
| Comparative Example 7 | 79.2 |
| Comparative Example 8 | 59.3 |
| Comparative Example 9 | 50.7 |
| Comparative Example 10 | 35.4 |

As shown in Table 2 and FIG. 2, the lithium batteries of Examples 3 and 4 including the organic electrolyte solution described above had improved lifespan characteristics at room temperature compared to lifespan characteristics of the lithium batteries of Comparative Examples 6 to 10.

Evaluation Example 4

Evaluation of Charging/Discharging Characteristics at High Temperature (45° C.)

Charing/discharging characteristics of the lithium secondary batteries manufactured in Examples 3 and 4 and Comparative Examples 6 to 10 were evaluated in the same manner as in Evaluation Example 3, except that a temperature was 45° C. instead of 25° C. Some of the results of the charging/discharging test are shown in Table 3 and FIG. 3.

TABLE 3

| | Capacity retention rate at 200th cycle [%] |
|---|---|
| Example 3 | 78.7 |
| Example 4 | 81.5 |
| Comparative Example 6 | 73.6 |
| Comparative Example 7 | 74.4 |
| Comparative Example 10 | 61.7 |

Figure 3:
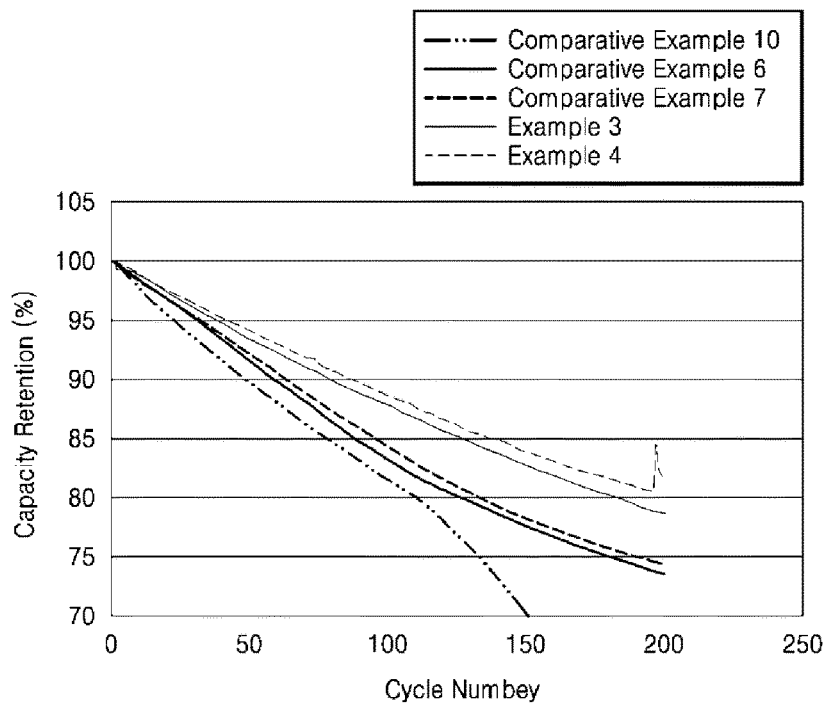
FIG. 3 is a graph illustrating lifespan characteristics of lithium batteries prepared according to Examples 3 and 4 and Comparative Examples 6, 7, and 10 at a high temperature.

As shown in Table 3 and FIG. 3, the lithium batteries of Examples 3 and 4 including the organic electrolyte solution described above had improved lifespan characteristics at high temperature compared to lifespan characteristics of the lithium batteries of Comparative Examples 6 to 10.

Evaluation Example 5

Evaluation of High-temperature Stability at 60° C.

In the 1st cycle, the lithium batteries of Examples 3 and 4 and Comparative Examples 6 to 10 were each charged at a constant current of 0.5 C rate at about 25° C. to a voltage of about 4.3 V, and then charged with a constant voltage while maintaining the voltage at 4.3 V until a current reached 0.05 C, followed by discharging with a constant current of 0.5 C rate until the voltage reached about 2.8 V.

In the 2nd cycle, each of the lithium batteries was charged at a constant current of 0.5 C rate to a voltage of about 4.3 V, and then charged with a constant voltage while maintaining the voltage at 4.3 V until a current reached 0.05 C, followed by discharging with a constant current of 0.2 C rate until the voltage reached about 2.8 V.

In the 3rd cycle, each of the lithium batteries was charged at a constant current of 0.5 C rate to a voltage of about 4.3 V, and then charged with a constant voltage while maintaining the voltage at 4.3 V until a current reached 0.05 C, followed by discharging with a constant current of 0.2 C rate until the voltage reached about 2.8 V. A discharge capacity at the 3rd cycle was considered as a standard capacity.

In the 4th cycle, each of the lithium batteries was charged at a constant current of 0.5 C rate to a voltage of about 4.30 V, and then charged with a constant voltage while maintaining the voltage at 4.30 V until a current reached 0.05 C. Next, the charged batteries were remained in an oven of a temperature of 60° C. for 10 days and 30 days, followed by taking the batteries out of the oven and discharging those with a constant current of 0.1 C rate until the voltage reached about 2.80 V.

Figure 4:
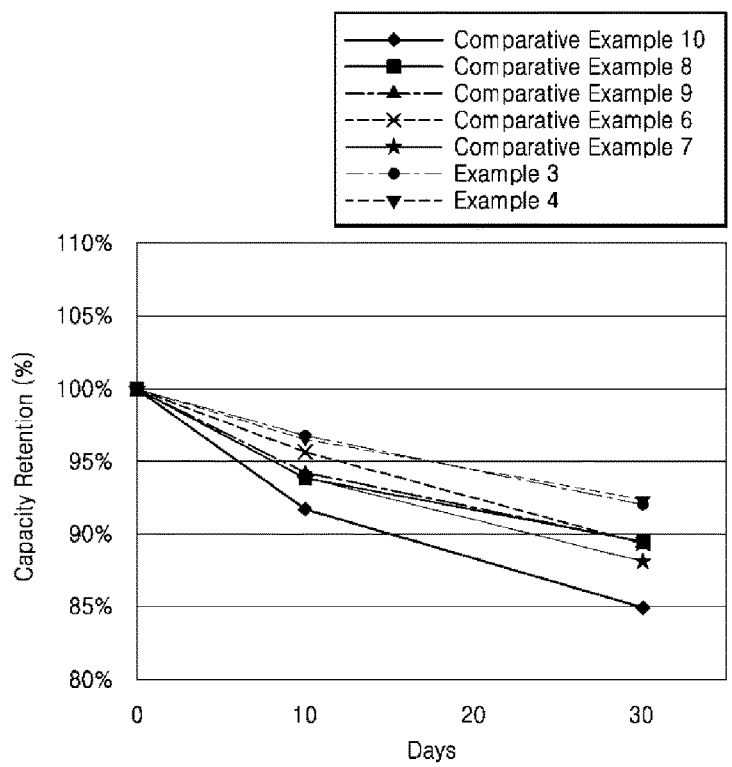
FIG. 4 is a graph illustrating capacity retention rates of lithium batteries prepared according to Examples 3 and 4 and Comparative Examples 6 to 10 after preserving the lithium batteries at a high temperature of 60° C.

The result of the charging/discharging test are shown in Table 4 and FIG. 4. A capacity retention rate after preserved at a high temperature may be defined using Equation 2 below.

Capacity retention rate after preserved at high temperature [%]=[Discharge capacity after preserved at high temperature at 4th cycle/Standard capacity]×100      Equation 2

(where, the standard capacity is a discharge capacity of a lithium battery at the 3rd cycle)

TABLE 4

| | Capacity retention rate after 10 days [%] | Capacity retention rate after 30 days [%] |
|---|---|---|
| Example 3 | 96.79 | 92.14 |
| Example 4 | 96.45 | 92.35 |

TABLE 4-continued

| | Capacity retention rate after 10 days [%] | Capacity retention rate after 30 days [%] |
|---|---|---|
| Comparative Example 6 | 95.67 | 89.40 |
| Comparative Example 7 | 93.89 | 88.17 |
| Comparative Example 8 | 93.90 | 89.58 |
| Comparative Example 9 | 93.79 | 8.68 |
| Comparative Example 10 | 91.76 | 84.98 |

As shown in Table 4 and FIG. 4, high-temperature stability of the lithium batteries of Examples 3 and 4 including the organic electrolyte solution described above was significantly increased compared to high-temperature stability of the lithium batteries of Comparative Examples 6 to 10 that did not include the organic electrolyte solution described above.

Evaluation Example 6

Evaluation of Direct Current Resistance (DC-IR) after Preserving at High Temperature Among the lithium batteries prepared according to Examples 3 and 4 and Comparative Examples 6 to 10, those lithium batteries that were not remained in the oven of a temperature of 60° C. and those remained in the oven of a temperature of 60° C. for 10 days and 30 days were subjected to a direct current internal resistance (DC-IR) measurement at room temperature (25° C.) by using the following method.

In the 1st cycle, each of the batteries was charged with a current of 0.5 C until a voltage that is 50% of a state of charge (SOC), cut-off at a current of 0.02 C, and rested for 10 minutes, discharged with a constant current of 0.5 C for 30 seconds, rested for 30 seconds, charged with a constant current of 0.5 C for 30 seconds, and rested for 10 minutes, discharged with a constant current of 1.0 C for 30 seconds, rested for 30 seconds, charged with a constant current of 0.5 C for 1 minute, and rested for 10 minutes, discharged with a constant current of 2.0 C for 30 seconds, rested for 30 seconds, charged with a constant current of 0.5 C for 2 minutes, and rested for 10 minutes, and discharged with a constant current of 3.0 C for 30 seconds, rested for 30 seconds, charged with a constant current of 0.5 C for 3 minutes, and rested for 10 minutes.

An average voltage decrease value for 30 seconds per C-rate of each of the batteries means a direct-current resistance value, i.e., $R=\Delta V/\Delta I$.

Figure 5:
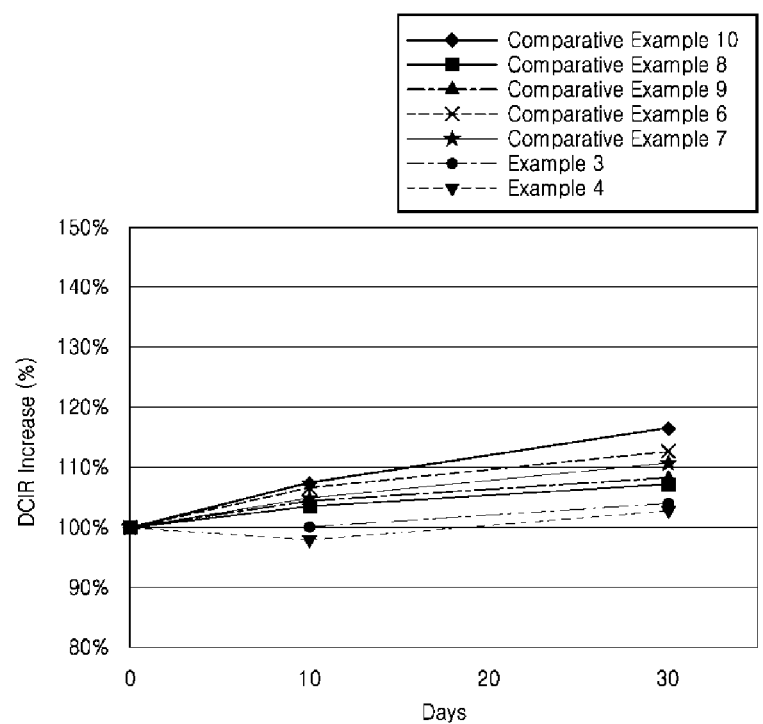
FIG. 5 is a graph illustrating direct current internal resistances (DC-IRs) of lithium batteries prepared according to Examples 3 and 4 and Comparative Examples 6 to 10 after preserving the lithium batteries at a high temperature.

Direct current resistance increase rates calculated from the initial direct current resistance and direct current resistances after preserving at high temperature thus measured are shown in Table 5 and FIG. 5. The direct current resistance increase rates of is defined using Equation 3 below.

Direct current resistance increase rate [%]=[Direct current resistance after preserving at high temperature/initial direct current resistance]×100      Equation 3

TABLE 5

| | Direct current resistance increase rate after 10 days [%] | Direct current resistance increase rate after 30 days [%] |
|---|---|---|
| Example 3 | 97.91 | 103.97 |
| Example 4 | 100.07 | 102.73 |

TABLE 5-continued

| | Direct current resistance increase rate after 10 days [%] | Direct current resistance increase rate after 30 days [%] |
|---|---|---|
| Comparative Example 6 | 106.74 | 112.62 |
| Comparative Example 7 | 104.88 | 110.74 |
| Comparative Example 8 | 103.41 | 107.19 |
| Comparative Example 9 | 104.39 | 108.25 |
| Comparative Example 10 | 107.33 | 116.57 |

As shown in Table 5 and FIG. 5, direct current resistance increase rates after preserving at high temperature of the lithium batteries of Examples 3 and 4 including the organic electrolyte solution described above were decreased compared to those of the lithium batteries of Comparative Examples 6 to 10 that did not include the organic electrolyte solution described above.

Evaluation Example 7

Evaluation of Power after Preserving at High Temperature of 85° C.

Among the lithium batteries prepared according to Examples 3 and 4 and Comparative Examples 6 to 10, those lithium batteries that were not remained in the oven and those remained in the oven of a temperature of 85° C. for 30 days were subjected to a direct current internal resistance (DC-IR) measurement by using the following method, and powers of the lithium batteries were calculated therefrom.

In the $1^{st}$ cycle, each of the batteries was charged with a current of 0.5 C until a voltage that is 50% of a state of charge (SOC), cut-off at a current of 0.02 C, and rested for 10 minutes, discharged with a constant current of 0.5 C for 30 seconds, rested for 30 seconds, charged with a constant current of 0.5 C for 30 seconds, and rested for 10 minutes, discharged with a constant current of 1.0 C for 30 seconds, rested for 30 seconds, charged with a constant current of 0.5 C for 1 minute, and rested for 10 minutes, discharged with a constant current of 2.0 C for 30 seconds, rested for 30 seconds, charged with a constant current of 0.5 C for 2 minutes, and rested for 10 minutes, and discharged with a constant current of 3.0 C for 30 seconds, rested for 30 seconds, charged with a constant current of 0.5 C for 3 minutes, and rested for 10 minutes.

An average voltage decrease value for 30 seconds per C-rate of each of the batteries means a direct-current resistance value.

In Table 6, the measured direct current resistances were represented as the powers of the lithium batteries.

Power change rates are defined using Equation 4 below. Initial power means a power for a battery that was not remained in the oven and power after preserving for 30 days means a power for battery that was remained in the oven of a temperature of 85° C. for 30 days.

Power change rate [%]=[Power after preserving for 30 days/initial power]×100    Equation 4

TABLE 6

| | Initial power [W] | Power after 30 days [W] | Power change rate [%] |
|---|---|---|---|
| Example 3 | 23.53 | 20.11 | 85.48 |
| Example 4 | 23.85 | 22.03 | 92.36 |
| Comparative Example 6 | 23.06 | 15.58 | 67.56 |
| Comparative Example 7 | 22.82 | 17.30 | 75.83 |
| Comparative Example 8 | 23.18 | 13.64 | 58.83 |
| Comparative Example 9 | 24.12 | 18.41 | 76.33 |
| Comparative Example 10 | 23.26 | 10.77 | 46.29 |

As shown in Table 6, power change rates of the lithium batteries of Examples 3 and 4 including the organic electrolyte solution described above increased compared to those of the lithium battery of Comparative Examples 6 to 10 that did not include the organic electrolyte solution described above.

As described above, according to the one or more of the above embodiments, when a lithium battery includes an organic electrolytic solution including a disultone-based compound having a novel structure; and an imide-based or a phosphate-based lithium salt, lifespan characteristics and stability at low-temperature, room temperature, and high-temperature of the lithium battery may improve.

It should be understood that exemplary embodiments described herein should be considered in a descriptive sense only and not for purposes of limitation. Descriptions of features or aspects within each exemplary embodiment should typically be considered as availed for other similar features or aspects in other exemplary embodiments.

In the present disclosure, the terms "Example", "Evaluation Example", "Preparation Example", and "Comparative Example" are used arbitrarily to simply identify a particular example or experimentation and should not be interpreted as admission of prior art. While one or more exemplary embodiments have been described with reference to the figures, it will be understood by those of ordinary skill in the art that various changes in form and details may be made therein without departing from the spirit and scope as defined by the following claims.

What is claimed is:

1. An organic electrolyte solution comprising:
   a first lithium salt that is at least one selected from lithium bis(fluorosulfonyl)imide ($Li(FSO_2)_2N$) and lithium difluorophosphate ($LiPO_2F_2$);
   a second lithium salt; and
   an organic solvent; and
   a disultone-based compound represented by Formula 1:

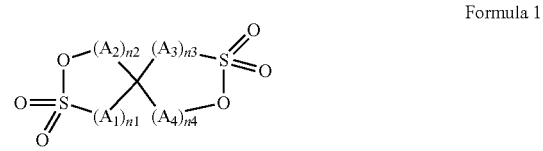

Formula 1 wherein, in Formula 1,
$A_1$, $A_2$, $A_3$, and $A_4$ are each independently selected from a C1 to C5 alkylene group unsubstituted or substituted with a substituent; a carbonyl group; or a sulfinyl group,
n1 to n4 are each independently an integer from 1 to 3, and when the number of $A_1$, $A_2$, $A_3$, and $A_4$ are each independently two or greater, the plurality of $A_1$, $A_2$, $A_3$, and $A_4$ are identical to or different from each other.

2. The organic electrolyte solution of claim 1, wherein an amount of the disultone-based compound is in a range of about 0.01 wt % to about 10 wt % based on the total weight of the organic electrolyte solution.

3. The organic electrolyte solution of claim 1, wherein an amount of the first lithium salt is in a range of about 0.01 wt % to about 5 wt % based on the total weight of the organic electrolyte solution.

4. The organic electrolyte solution of claim 1 further comprising a non-polar unsaturated group-containing cyclic carbonate compound.

5. The organic electrolyte solution of claim 4, wherein the non-polar unsaturated group-containing cyclic carbonate compound is one selected from the group consisting of vinylene carbonate (VC); vinylene carbonate substituted with at least one substituent selected from a halogen, a cyano group (CN), and a nitro group ($NO_2$); vinyl ethylene carbonate (VEC); and vinyl ethylene carbonate substituted with at least one substituent selected from a halogen, a cyano group (CN), and a nitro group ($NO_2$).

6. The organic electrolyte solution of claim 4, wherein an amount of the non-polar unsaturated group-containing cyclic carbonate compound is in a range of about 0.01 wt % to about 5 wt % based on the total weight of the organic electrolyte solution.

7. The organic electrolyte solution of claim 1, wherein the second lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are each independently an integer of 1 to 20), LiCl, LiI, and a mixture thereof.

8. The organic electrolyte solution of claim 1, wherein at least one of $A_1$, $A_2$, $A_3$, and $A_4$ is an unsubstituted C1 to C5 alkylene group or a substituted C1 to C5 alkylene group, and a substituent of the substituted C1 to C5 alkylene group may be a C1 to C5 alkyl group unsubstituted or substituted with halogen; a C1 to C5 aryl group unsubstituted or substituted with halogen; a C2 to C10 heteroaryl group unsubstituted or substituted with halogen; a C2 to C5 alkenyl group unsubstituted or substituted with halogen; a C2 to C5 alkynyl group unsubstituted or substituted with halogen; or a polar functional group including a hetero atom.

9. The organic electrolyte solution of claim 1, wherein at least one of $A_1$, $A_2$, $A_3$, and $A_4$ is an unsubstituted C1 to C5 alkylene group or a substituted C1 to C5 alkylene group, wherein a substituent of the substituted C1 to C5 alkylene group is at least one selected from the group consisting of a halogen, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrolyl group, and a pyridinyl group.

10. The organic electrolyte solution of claim 1, wherein the disultone-based compound is represented by one of Formulae 2 and 3:

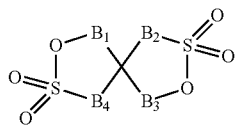

Formula 2

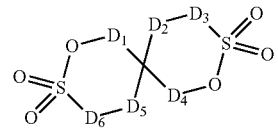

Formula 3 wherein, in Formulae 2 and 3, $B_1$, $B_2$, $B_3$, $B_4$, $D_1$, $D_2$, $D_3$, $D_4$, $D_5$, and $D_6$ are each independently —$C(E_1)(E_2)$—; a carbonyl group; or a sulfinyl group, and $E_1$ and $E_2$ are each independently a hydrogen atom; a halogen atom; a C1 to C5 alkyl group unsubstituted or substituted with halogen; a C5 to C10 aryl group unsubstituted or substituted with halogen; or a C2 to C10 heteroaryl group unsubstituted or substituted with halogen.

11. The organic electrolyte solution of claim 10, wherein $E_1$ and $E_2$ are each independently at least one selected from a hydrogen atom, a fluorine atom, a chlorine atom, a bromine atom, an iodine atom, a methyl group, an ethyl group, a propyl group, an isopropyl group, a butyl group, a tert-butyl group, a trifluoromethyl group, a pentafluoroethyl group, a phenyl group, a naphthyl group, a tetrafluorophenyl group, a pyrrolyl group, and a pyridinyl group.

12. The organic electrolyte solution of claim 1, wherein the disultone-based compound is represented by one of Formulae 4 and 5:

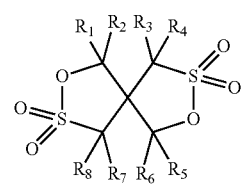

Formula 4

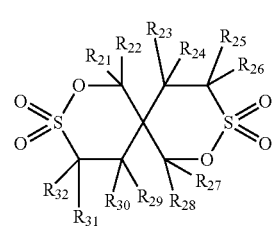

Formula 5 wherein, in Formulae 4 and 5, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ are each independently an additive that is a hydrogen atom; a halogen atom; a C1 to C5 alkyl group unsubstituted or substituted with halogen; a C5 to C10 aryl group unsubstituted or substituted with halogen; or a C2 to C10 heteroaryl group unsubstituted or substituted with halogen.

13. The organic electrolyte solution of claim 1, wherein the disultone-based compound is represented by one of Formulae 6 to 17:

Formula 6
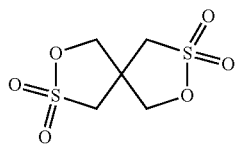

Formula 7
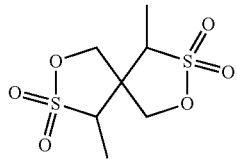

Formula 8
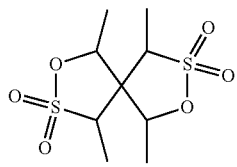

Formula 9
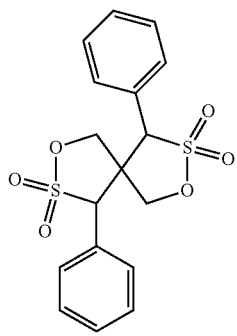

Formula 10
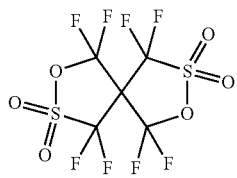

Formula 11
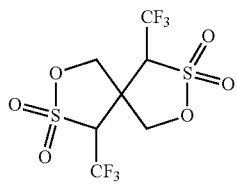

Formula 12
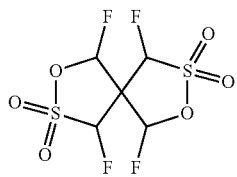

Formula 13
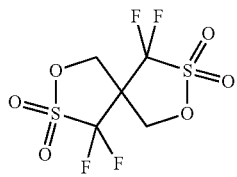

Formula 14
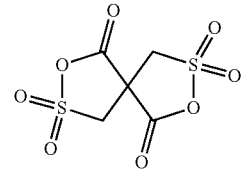

Formula 15
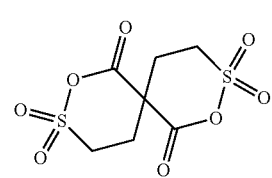

Formula 16
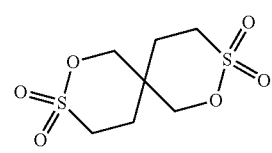

Formula 17
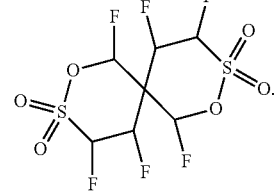

14. The organic electrolyte solution of claim 1, wherein the organic solvent comprises at least one selected from the group consisting of dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile (SN), dimethylsulfoxide, dimethylformamide, dimethylacetamide, gamma-valerolactone, gamma-butyrolactone, and tetrahydrofuran.

15. A lithium battery comprising a cathode; an anode; and an organic electrolyte solution wherein, the organic electrolyte solution comprising:
a first lithium salt that is at least one selected from lithium bis(fluorosulfonyl)imide ($Li(FSO_2)_2N$) and lithium difluorophosphate ($LiPO_2F_2$);
a second lithium salt;
an organic solvent; and
a disultone-based compound represented by Formula 1:

Formula 1
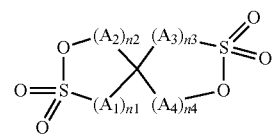

wherein, in Formula 1,
$A_1$, $A_2$, $A_3$, and $A_4$ are each independently selected from a C1 to C5 alkylene group unsubstituted or substituted with a substituent; a carbonyl group; or a sulfinyl group, n1 to n4 are each independently an integer from 1 to 3, and when the number of $A_1$, $A_2$, $A_3$, and $A_4$ are each independently two or greater, the plurality of $A_1$, $A_2$, $A_3$, and $A_4$ are identical to or different from each other.

16. The lithium battery of claim 15, wherein the disultone-based compound is selected from the group consisting of compounds represented by Formulae 6 to 17:

Formula 6

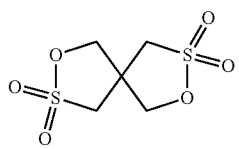

Formula 7

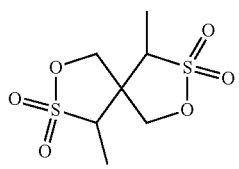

Formula 8

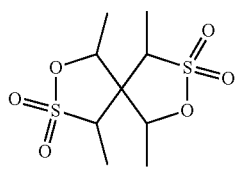

Formula 9

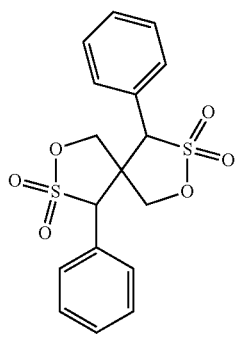

Formula 10

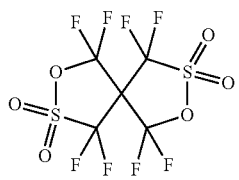

Formula 11

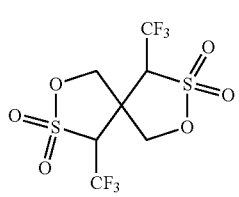

Formula 12

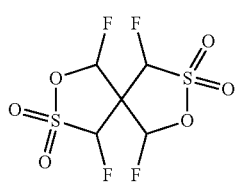

Formula 13

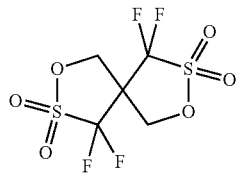

Formula 14

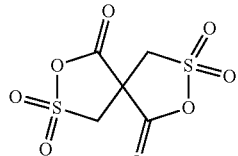

Formula 15

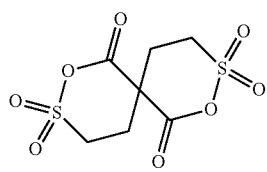

Formula 16

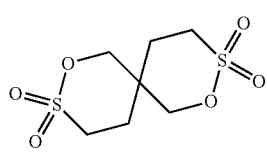

Formula 17

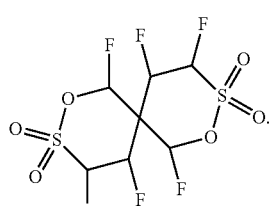

17. The lithium battery of claim 15, wherein the second lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are each independently an integer of 1 to 20), LiCl, LiI, and a mixture thereof.

18. The lithium battery of claim 15, wherein an amount of the disultone-based compound is in a range of about 0.01 wt % to about 10 wt % based on the total weight of the organic electrolyte solution.

19. The lithium battery of claim 15, wherein an amount of the first lithium salt is in a range of about 0.01 wt % to about 5 wt % based on the total weight of the organic electrolyte solution.

20. The lithium battery of claim 15, wherein the organic electrolyte solution of further comprises a non-polar unsaturated group-containing cyclic carbonate compound.

21. The lithium battery of claim 20, wherein the non-polar unsaturated group-containing cyclic carbonate containing compound is one selected from the group consisting of vinylene carbonate (VC); vinylene carbonate substituted with at least one substituent selected from a halogen, a cyano group (CN), and a nitro group ($NO_2$); vinyl ethylene carbonate (VEC); and vinyl ethylene carbonate substituted with at least one substituent selected from a halogen, a cyano group (CN), and a nitro group ($NO_2$).

* * * * *